United States Patent
Faibish et al.

(10) Patent No.: US 9,942,326 B1
(45) Date of Patent: Apr. 10, 2018

(54) IN-MEMORY DATABASE WITH MEMORY CLUSTERING UTILIZING SOFTWARE-DEFINED STORAGE FUNCTIONALITY

(71) Applicant: EMC Corporation, Hopkinton, MA (US)

(72) Inventors: Sorin Faibish, Newton, MA (US); Sassan Teymouri, Saratoga, CA (US); John M. Bent, Los Alamos, NM (US); James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 217 days.

(21) Appl. No.: 14/973,204

(22) Filed: Dec. 17, 2015

(51) Int. Cl.
*G06F 15/16* (2006.01)
*H04L 29/08* (2006.01)

(52) U.S. Cl.
CPC .......... *H04L 67/1097* (2013.01); *H04L 67/16* (2013.01)

(58) Field of Classification Search
CPC .............................. H04L 67/1097; H04L 67/16
USPC ........................................... 703/219; 711/114
See application file for complete search history.

(56) References Cited

U.S. PATENT DOCUMENTS

| | | | | |
|---|---|---|---|---|
| 8,620,962 | B1* | 12/2013 | Strunk | G06F 17/30094 707/797 |
| 9,652,161 | B2* | 5/2017 | Mehra | G06F 3/0619 |
| 2013/0227194 | A1 | 8/2013 | Kannan et al. | |
| 2013/0282994 | A1* | 10/2013 | Wires | G06F 3/0604 711/158 |
| 2013/0290636 | A1* | 10/2013 | Chen | G06F 12/0811 711/122 |
| 2014/0173199 | A1* | 6/2014 | Gupta | G06F 17/30221 711/117 |

(Continued)

OTHER PUBLICATIONS

"EMC 2 Tiers Solution Prototype," http://veddiew.typepad.com/blog/2015/05/emc-two-tiers-storage-solution-prototype.html, Sep. 25, 2015, 2 pages.

(Continued)

*Primary Examiner* — Duyen Doan
(74) *Attorney, Agent, or Firm* — Ryan, Mason & Lewis, LLP

(57) ABSTRACT

An apparatus in one embodiment comprises a plurality of compute nodes each having a processor coupled to a memory. The apparatus further comprises a storage system configured for communication with the compute nodes over at least one network, with the storage system comprising a software-defined storage controller configured to implement an in-memory database accessible as a unified memory cluster to respective processors of the compute nodes. The in-memory database comprises portions of respective memories of the compute nodes. The in-memory database may be expanded, for example, using an additional portion of the memory of one of the compute nodes, responsive to an overflow event associated with the memory of another one of the compute nodes. The compute nodes may illustratively comprise respective analysis nodes that run respective applications configured to utilize analytics functionality of the in-memory database. Other illustrative embodiments include systems, methods and processor-readable storage media.

20 Claims, 4 Drawing Sheets

(56) References Cited

U.S. PATENT DOCUMENTS

2015/0312366 A1* 10/2015 Ben-Yehuda ........... H04L 67/10
709/213
2016/0070494 A1* 3/2016 Barnes ................ H04L 67/1097
711/104

OTHER PUBLICATIONS

EMC Corporation, "EMC Tiered Storage for SAP: a New Way to Optimize with Use Cases for EMC Symmetrix VMAX with FAST and Virtual LUN," White Paper, Applied Technology, May 2010, 14 pages.

EMC Corporation, "EMC ScaleIO," V1.32, User Guide, #302-001-033, Rev. 11, May 2015, 536 pages.

EMC Corporation, "EMC 2-Tiers—POSIX Namespace for 2nd and 3rd Platform Storage Systems," Dec. 2015, 3 pages.

J. Hilland et al., "RDMA Protocol Verbs Specification (Version 1.0)," draft-hillard-iwarp-verbs-v1.0, Apr. 2003, 243 pages.

EMC Corporation, "EMC Elastic Cloud Storage—Software-Defined Object Storage—Cloud-Scale Capabilities and Economics," EMC Data Sheet, Oct. 2015, 4 pages.

EMC Corporation, "EMC ATMOS Cloud Storage—A Platform to Store, Archive, and Access Unstructured Data at Scale—Data, Application, Access Demands," EMC Data Sheet, Sep. 2014, 3 pages.

EMC Corporation, "Technical White Paper: Elastic Cloud Storage Software Atchitecture—Deploy a Modern Hyperscale Storage Platform on Commodity Infrastructure," EMC White Paper, Feb. 2015, 12 pages.

EMC Corporation, "EMC SCALEIO Operation Overview—Ensuring Non-Disruptive Operation and Upgrade," EMC White Paper, Mar. 2015, 10 pages.

U.S. Appl. No. 14/871,160 filed in the name of S. Faibish et al. on Sep. 30, 2015 and entitled "Translation-Based Name Node Configuration for Object Access in a Multi-Tier Storage System."

Adam Moody, "Overview of the Scalable Checkpoint / Restart (SCR) Library," S&T Principal Directorate—Computation Directorate, Oct. 14, 2009, 33 pages.

* cited by examiner

IN-MEMORY DATABASE WITH MEMORY CLUSTERING UTILIZING SOFTWARE-DEFINED STORAGE FUNCTIONALITY

FIELD

The field relates generally to information processing systems, and more particularly to storage in information processing systems.

BACKGROUND

Storage systems are often configured to include multiple storage tiers, with different ones of the tiers providing different levels of input-output (IO) performance or other characteristics. In such systems, data may be moved from one tier to another within a given storage system based on access frequency of the data or other factors.

These and other types of storage systems may incorporate one or more object stores. In an object store, data is exposed and managed in the form of objects instead of files or blocks. Different objects can include different amounts and types of unstructured data but each object is identified by a globally unique identifier. Objects can therefore be stored in a flat address space such as a storage pool. The unique identifier of a given object allows an application or other requesting entity to retrieve that object without needing to know the physical location in which the object is stored. Accordingly, object stores abstract away complexities associated with lower level storage functions. Object stores are commonly utilized in cloud storage environments and numerous other storage applications.

Despite the advantages associated with storage tiering and object stores, additional improvements are needed in terms of data access performance and scalability, particularly for storage implemented in information processing systems that include potentially large numbers of compute nodes.

SUMMARY

Illustrative embodiments of the present invention provide information processing systems that include in-memory databases in which memory clustering is implemented utilizing software-defined storage functionality.

In one embodiment, an apparatus comprises a plurality of compute nodes each having a processor coupled to a memory. The apparatus further comprises a storage system configured for communication with the compute nodes over at least one network, with the storage system comprising a software-defined storage controller configured to implement an in-memory database accessible as a unified memory cluster to respective processors of the compute nodes. The in-memory database comprises portions of respective memories of the compute nodes.

The in-memory database may be expanded, for example, using an additional portion of the memory of one of the compute nodes, responsive to an overflow event associated with the memory of another one of the compute nodes.

The compute nodes may illustratively comprise respective analysis nodes that run respective applications configured to utilize analytics functionality of the in-memory database.

In some embodiments, the in-memory database is associated with a particular storage tier of a multi-tier storage system. For example, one or more embodiments implement an in-memory database as an additional tier above a fast tier in a 2 TIERS™ storage system, although other types of multi-tier storage systems can be used in other embodiments.

Illustrative embodiments can provide significant improvements in terms of data access performance and scalability relative to conventional arrangements. For example, reduced data access latency can be provided and larger numbers of nodes supported than in conventional SAP HANA and Tachyon implementations. Similar advantages are provided for other in-memory database applications.

These and other illustrative embodiments include, without limitation, apparatus, systems, methods and processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

Figure 1:
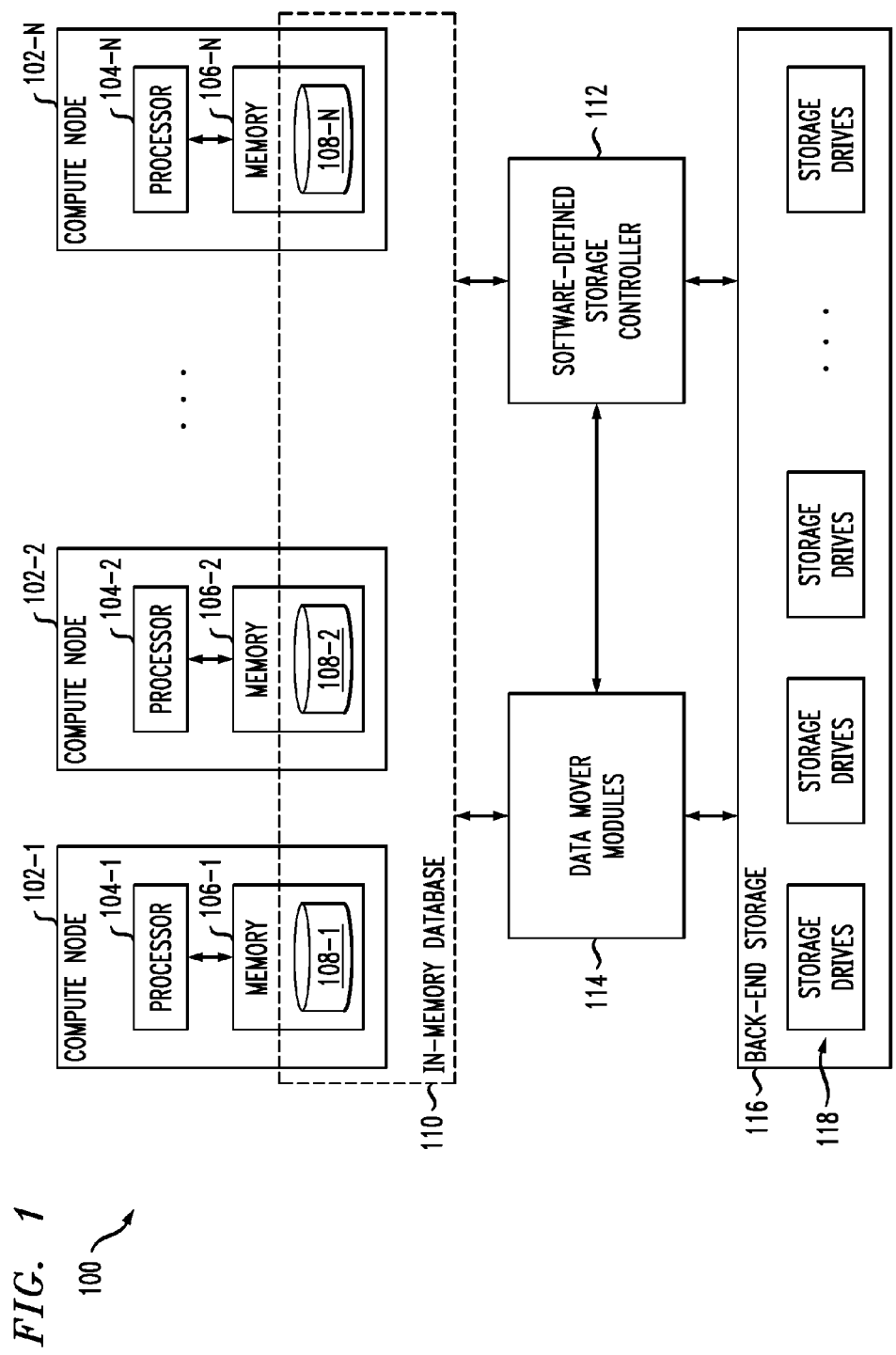
FIG. 1 is a block diagram of an information processing system comprising an in-memory database in which memory clustering is implemented using software-defined storage functionality in an illustrative embodiment of the invention.

FIG. 1 shows an information processing system 100 configured in accordance with an illustrative embodiment of the present invention. The information processing system 100 comprises compute nodes 102-1, 102-2, . . . 102-N comprising respective processors 104-1, 104-2, . . . 104-N coupled to respective memories 106-1, 106-2, . . . 106-N. Portions 108-1, 108-2, . . . 108-N of the respective memories 106-1, 106-2, . . . 106-N collectively comprise an in-memory database 110 implemented under the control of a software-defined storage controller 112. The in-memory database 110 thus comprises portions 108 of respective memories 106 of the compute nodes 102. The in-memory database 110 is accessible as a unified memory cluster to the respective processors 104 of the compute nodes 102.

The unified memory cluster in this embodiment serves as a single common storage pool utilized by all of the compute nodes 102. The software-defined storage controller 112 is configured to implement the in-memory database 110 as the unified memory cluster accessible to respective processors 104 of the compute nodes 102.

The compute nodes 102 are assumed to comprise respective analysis nodes that run respective applications configured to utilize analytics functionality of the in-memory database 110. Numerous other types of compute nodes can be used in other embodiments, including various combinations of multiple compute nodes of different types. For example, at least a subset of the compute nodes 102 in some implementations can comprise virtual machines or containers running in cloud infrastructure.

The in-memory database 110 in some embodiments incorporates or otherwise supports analytics functionality utilized by the compute nodes 102. For example, the in-memory database 110 may comprise an in-memory database analytics engine such as SAP HANA that comprises a relational database management system.

The analytics functionality can alternatively be provided using in-memory data analytics products such as Tachyon. Numerous other types of analytics functionality can be provided using in-memory database 110 in other embodiments.

Also, the unified memory cluster provided by the portions 108 comprising the in-memory database 110 is assumed to have an associated file system configured to support analytics functionality of the in-memory database 110. For example, an XFS file system or other type of file system can be built on top of the unified memory cluster. Such a file system can be used, for example, to support Tachyon in-memory data analytics or other types of in-memory data analytics functionality of the in-memory database 110.

The portions 108 of the respective memories 106 of the compute nodes 102 may comprise, for example, respective dynamic random access memories (DRAMs) of the compute nodes 102. Alternative arrangements are possible. For example, the portions 108 of the respective memories 106 of the compute nodes 102 may comprise respective flash memories, or various combinations of DRAM, flash or other types of electronic memory.

The compute nodes 102 in the present embodiment are assumed to be interconnected with one another using high-speed connections. For example, data can be moved between the compute nodes 102 using remote direct memory access (RDMA) connections over InfiniBand or Gigabit Ethernet. Numerous other types of connections and associated data transfer protocols can be used in other embodiments.

The software-defined storage controller 112 is assumed to be part of a storage system that in the FIG. 1 embodiment further comprises data mover modules 114 and back-end storage 116. Such a storage system or individual portions thereof are further assumed to be configured for communication with the compute nodes 102 over at least one network although such networks are not explicitly shown in the figure.

The software-defined storage controller 112 in some embodiments is implemented using software-defined storage products such as ScaleIO™ or ViPR® both of which are commercially available from EMC Corporation of Hopkinton, Mass.

For example, implementations utilizing ScaleIO™ for the software-defined storage controller can advantageously support hundreds or thousands of compute nodes, potentially providing a single memory pool with a capacity on the order of a petabyte (PB). Such an arrangement overcomes scalability limitations inherent in certain conventional systems used to implement in-memory data analytics functionality with SAP HANA or Tachyon. Also, failure protection functionality provided by ScaleIO™ can be used to protect the in-memory database 110 from failures in one or more of the compute nodes 102.

Additional details regarding ScaleIO™ functionality that can be incorporated into a software-defined storage controller in illustrative embodiments can be found in, for example, EMC ScaleIO™ User Guide, V1.32, Document No. 302-001-033, Rev. 11, May 2015, which is incorporated by reference herein.

The data mover modules 114 are illustratively configured to move data between the in-memory database 110 and the back-end storage 116. The back-end storage comprises a plurality of storage drives 118.

In some embodiments, the storage system that includes data mover modules 114 and back-end storage 116 is implemented as a multi-tier storage system having at least a front-end storage tier and a back-end storage tier with the front-end storage tier comprising a fast tier having a relatively high input-output processing speed and a relatively low capacity and the back-end storage tier comprising a capacity tier having a relatively low input-output processing speed and a relatively high capacity, although other types of multi-tier storage systems can be used in other embodiments.

A given multi-tier storage system illustratively comprises multiple hierarchical storage tiers for use in hierarchical storage management (HSM). A data mover module is illustratively coupled to the storage tiers and configured to control transfer of data between the storage tiers. The term "data movement" as used in this and other contexts herein is intended to be broadly construed, so as to encompass data migration as well as other types of movement of data between storage tiers. A given data mover module can be implemented at least in part on storage arrays or other storage platforms that implement at least portions of one or more of the storage tiers of the multi-tier storage system.

Each of at least a subset of the storage tiers of a multi-tier storage system comprises a plurality of storage drives with different types of storage drives being used in different ones of the storage tiers. For example, a fast tier may comprise flash drives while a capacity tier comprises disk drives. The particular storage drives used in a given storage tier may be varied in other embodiments, and multiple distinct storage drive types may be used within a single storage tier. The term "storage drive" as used herein is intended to be broadly construed, so as to encompass, for example, disk drives, flash drives, solid state drives, hybrid drives or other types of storage products and devices.

The storage drives utilized in a fast tier are generally significantly faster in terms of read and write access times than the drives utilized in a capacity tier. Accordingly, the fast tier is a relatively small storage tier optimized for IO processing speed, while the capacity tier is a relatively large but slower storage tier optimized for storage capacity. Terms such as "fast" and "slow" in this context are relative terms and not intended to denote any particular absolute performance level. However, numerous alternative tiering arrangements may be used, including arrangements with three or more tiers each providing a different level of performance. Also, the various tiers of a given multi-tier storage system in other embodiments need not be arranged as respective front-end and back-end storage tiers. Accordingly, numerous alternative storage tiering arrangements can be used in other embodiments.

The term "multi-tier storage system" as used herein is therefore intended to be broadly construed so as to encompass any of a wide variety of different arrangements of storage tiers. The term "storage tier" as used herein is also intended to be broadly construed, and may comprise, for example, a single storage array or a single-tier storage system.

In some embodiments, the fast and capacity tiers of a multi-tier storage system are implemented in the form of a 2 TIERS™ storage system from EMC Corporation of Hopkinton, Mass.

By way of example, a given 2 TIERS™ storage system may comprise a fast tier implemented using DSSD™ server-based flash storage devices, also from EMC Corporation, and a capacity tier comprising one or more object stores. In such an arrangement, an IO dispatcher software layer of the 2 TIERS™ storage system may be configured to pre-fetch data from the DSSD™ storage devices of the fast tier into the in-memory database 110. The IO dispatcher software layer can additionally or alternatively be used to prefetch data from the one or more object stores of the capacity tier into the DSSD™ storage devices of the fast tier.

It should be noted that access predictions or other hints provided using analytics applications associated with in-memory data analytics products such as Tachyon can be utilized by the IO dispatcher software layer of the 2 TIERS™ storage system to provide the fastest possible access to needed data files.

A wide variety of other types of server-based flash storage devices and multi-tier storage systems can be used in other embodiments, as will be apparent to those skilled in the art. References herein to DSSD™ storage devices and the 2 TIERS™ storage system are by way of example only.

The data mover modules 114 may be configured to control movement of data between one or more storage tiers and portions 108 of in-memory database 110 in order to facilitate achievement of desired levels of performance by system users.

The "users" in this embodiment may refer, for example, to respective ones of the compute nodes 102, although the term "user" as utilized herein is intended to be broadly construed so as to encompass numerous other arrangements of human, hardware, software or firmware entities, as well as combinations of such entities.

The data mover modules 114 can communicate with the compute nodes 102, software-defined storage controller 112 and back-end storage 116 via one or more networks or other types of communication media.

In an embodiment comprising a multi-tier storage system, the in-memory database 110 may be implemented as an additional tier of the multi-tier storage system above the front-end storage tier of the multi-tier storage system. Additionally or alternatively, the back-end storage tier may comprise one or more object stores each configured to store data in the form of objects having respective object identifiers (OIDs).

As noted above, the compute nodes 102 are assumed to communicate with the storage system over at least one network, which is not explicitly shown in the figure. The compute nodes 102 may comprise respective computers in a cluster of computers associated with a supercomputer or other high performance computing (HPC) system. The term "compute node" as used herein is intended to be broadly construed, and such nodes in some embodiments may comprise respective analysis nodes or other types of compute nodes. Applications running on such nodes illustratively include what are referred to herein as "analysis applications" but such applications are also intended to be broadly construed.

Although shown as a separate component in this embodiment, the software-defined storage controller 112 in other embodiments can be implemented at least in part within the back-end storage 116 or within another system component. For example, the software-defined storage controller 112 in other embodiments can be implemented in association with a fast tier or other front-end storage tier of a multi-tier storage system.

It is also possible to implement the software-defined storage controller 112 in a distributed manner, with portions of the controller possibly being implemented on respective ones of the compute nodes or associated processing platforms. Other types of distributed implementations of the software-defined storage controller 112 are possible. For example, at least a subset of the software-defined storage functionality of the controller 112 can be implemented on respective servers that are separate from the compute nodes 102.

Accordingly, the software-defined storage controller 112 can be implemented in a distributed manner using the compute nodes 102 or respective IO nodes that are associated with but separate from those compute nodes. The data mover modules 114 can similarly be implemented in a distributed manner, possibly using the same compute or IO nodes that are used to implement respective portions of the software-defined storage controller 112. The IO nodes may illustratively comprise respective servers.

It is to be appreciated that these and other features of illustrative embodiments are presented by way of example only, and should not be construed as limiting in any way.

Accordingly, different numbers, types and arrangements of compute nodes, in-memory databases, software-defined storage controllers, storage tiers, data mover modules and back-end storage can be used in other embodiments.

The software-defined storage controller 112, data mover modules 114, back-end storage 116 and possibly other elements of the system 100 can be implemented using one or more storage platforms. For example, a given storage platform can comprise any of a variety of different types of storage including network-attached storage (NAS), storage area networks (SANs), direct-attached storage (DAS) and distributed DAS, as well as combinations of these and other storage types, including software-defined storage.

A given storage platform may comprise storage arrays such as VNX® and Symmetrix VMAX® storage arrays, both commercially available from EMC Corporation. Other types of storage products that can be used in implementing a given storage platform in an illustrative embodiment include the previously-mentioned software-defined storage products such as ScaleIO™ and ViPR®, and server-based flash storage devices such as DSSD™, as well as cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage platform in an illustrative embodiment.

These and other storage platforms can be part of what is more generally referred to herein as a processing platform comprising one or more processing devices each comprising a processor coupled to a memory, and the processing device may be implemented at least in part utilizing one or more virtual machines or other types of virtualization infrastructure such as Docker containers or other types of Linux containers (LXCs). The software-defined storage controller 112 and data mover modules 114, as well as other system components, may be implemented at least in part using processing devices of such processing platforms.

For example, in a distributed implementation of the software-defined storage controller 112, the software-defined storage modules of the distributed software-defined storage controller are implemented in respective LXCs running on respective ones of the compute nodes or associated IO nodes.

Communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 2. The process as shown includes steps 200 through 204, and is suitable for use in the system 100 but is more generally applicable to other types of systems comprising multiple compute nodes, an in-memory database and an associated software-defined storage controller.

In step 200, a storage system is configured for communication over at least one network with a plurality of compute nodes each comprising a processor coupled to a memory. In the context of the FIG. 1 embodiment, the storage system illustratively comprises software-defined storage controller 112, data mover modules 114 and back-end storage 116, although as indicated previously numerous alternative storage system configurations can be used in other embodiments, including various types of multi-tier storage systems.

In step 202, a software-defined storage controller of the storage system is utilized to implement an in-memory database accessible as a unified memory cluster to respective processors of the compute nodes. The in-memory database comprises portions of respective memories of the compute nodes. With reference to FIG. 1, the software-defined storage controller 112 of information processing system 100 implements in-memory database 110 comprising portions 108 of respective memories 106 of the compute nodes 102. As mentioned above, the software-defined storage controller in some embodiments comprises a ScaleIO™ software-defined storage controller or a ViPR® software-defined storage controller. Other types of software-defined storage controllers can be used in other embodiments, and such software-defined storage controllers can be part of or otherwise associated with a given storage system comprising at least one storage platform.

In step 204, the in-memory database is expanded using an additional portion of the memory of one of the compute nodes responsive to an overflow event associated with the memory of another one of the compute nodes.

For example, the size of the portion 108-$i$ of the memory 106-$i$ of compute node 102-$i$ may be increased responsive to an overflow condition involving another portion 108-$k$ of the memory 106-$k$ of compute node 102-$k$, where i and k are distinct integer values in the range 1, 2, . . . N. Additionally or alternatively, the size of the portion 108-$i$ of the memory 106-$i$ of compute node 102-$i$ may be increased responsive to an overflow condition involving that same particular portion. In other words, the size of the portion 108-$i$ can be increased responsive to an overflow condition involving that portion by allocating part of any remaining allocable portion of memory 106-$i$ to the portion 108-$i$. If there is no remaining allocable portion of memory 106-$i$, the portions of the memories of one or more other compute nodes can be increased to permit suitable expansion of the in-memory database responsive to the overflow condition involving the portion 108-$i$ of the memory 106-$i$. It is also possible that one or more additional compute nodes may be added to the set of compute nodes having respective memories that comprise respective portions of the in-memory database 110.

Conditions other than overflow events can be used to control expansion of the in-memory database 110. The overflow events and other conditions are assumed to be monitored by the software-defined storage controller 112 so that it can take the appropriate actions responsive to such conditions. These actions may alternatively involve contracting the in-memory database 110. For example, it is possible that one or more of the portions 108 respectively associated with one or more of the compute nodes 102 can be removed from the in-memory database 110 under certain conditions.

In some embodiments, the in-memory database 110 comprises a column-oriented database or a row-oriented database. It is also possible for hybrid column-oriented and row-oriented arrangements to be used. For example, the in-memory database 110 may comprise column-oriented portions in the memories 106 of one or more of the compute nodes 102 and row-oriented portions in the memories 106 of one or more other ones of the compute nodes 102. In such an arrangement, the in-memory database 110 may be expandable by both row and column responsive to one or more overflow events or other specified conditions.

The expansion of the in-memory database in step 204 is exemplary only, and additional or alternative actions may be taken in other embodiments. These include the above-noted potential contraction of the in-memory database under certain conditions, as well as various types of failure recovery. For example, the in-memory database 110 may be configured to recover from a failure in the memory of one of the compute nodes 102 by obtaining corresponding data from the memory of another one of the compute nodes 102. Such failure recovery is assumed to be directed at least in part by the software-defined storage controller 112. A wide variety of other types of configuration or control of the in-memory database 110 can be provided by the software-defined storage controller 112.

Figure 2:
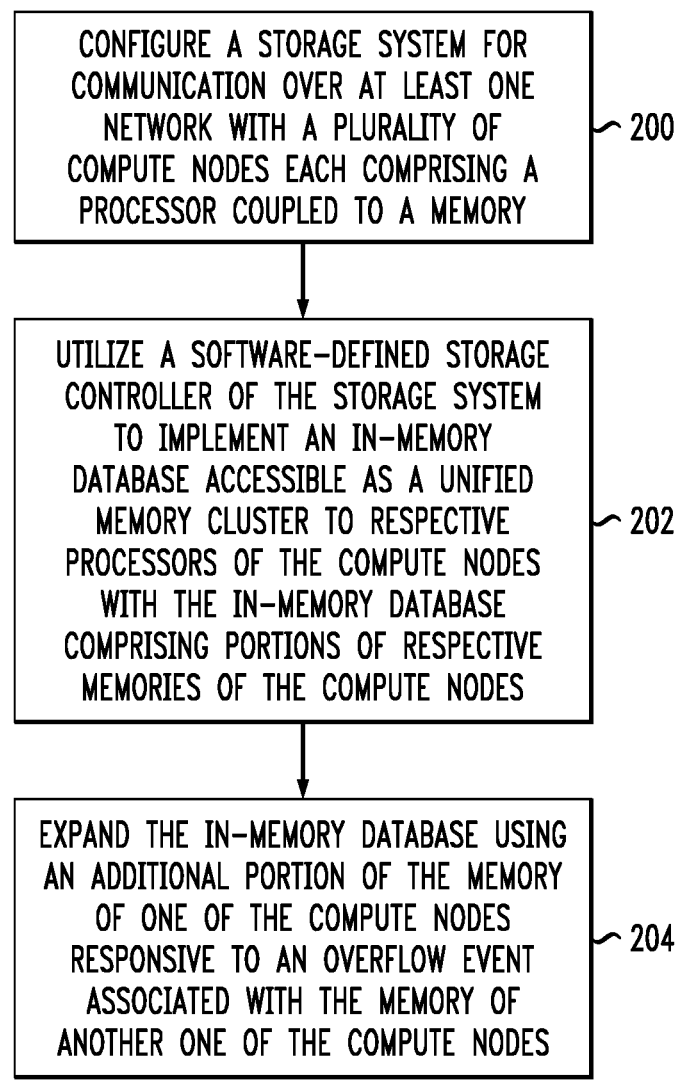
FIG. 2 is a flow diagram of an exemplary process for memory clustering of an in-memory database utilizing software-defined storage functionality in the information processing system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations involving an in-memory database implemented utilizing a software-defined storage controller. For example, the ordering of the process steps may be varied in other embodiments, or certain steps may be performed concurrently with one another rather than serially. Also, one or more of the process steps may be repeated periodically, or multiple instances of the process can be performed in parallel with one another in order to implement a plurality of different in-memory databases within a given information processing system.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Another illustrative embodiment of an information processing system comprising an in-memory database and an associated software-defined storage controller will now be described with reference to FIG. 3. In this embodiment, information processing system 300 comprises a set of N compute nodes 302-1, 302-2, 302-3, 302-4, . . . 302-N having respective processors 304-1, 304-2, 304-3, 304-4, . . . 304-N coupled to respective memories 306-1, 306-2, 306-3, 306-4, . . . 306-N. The first compute node 302-1 is also identified in the figure as Node 1.

Portions of the memories 306 that contain data as opposed to software code are configured to collectively form an in-memory database 310. It is assumed that the in-memory database 310 is implemented utilizing a software-defined storage controller, such a ScaleIO™ software-defined storage controller or a ViPR® software-defined storage controller, although the controller is not explicitly shown in this figure.

Each of the processors 304 is also denoted "P" in this embodiment and comprises a plurality of processor cores with the individual cores being denoted "C." The memories 306 each comprise multiple portions, including code portions that include software program code for execution by the corresponding processor, and data portions that form parts of the in-memory database 310.

The back-end storage 316 in this embodiment comprises a plurality of storage volumes 318-1, 318-2, 318-3, 318-4, . . . 318-N associated with respective ones of the compute nodes 302-1, 302-2, 302-3, 302-4, . . . 302-N.

It is assumed in this embodiment that the compute nodes 302 are configured to communicate with one another over high-speed connections such as the above-noted RDMA connections. These RDMA connections can be configured to support data transfer between the memories 306 of the compute nodes using RDMA verbs.

An arrangement of this type makes it possible to implement a unified memory cluster that can achieve very low latencies on the order of 700 nanoseconds or less. Such reduced latencies considerably enhance the performance of in-memory data analytics functionality such as that implemented using SAP HANA or Tachyon.

As mentioned previously, the RDMA connections can be provided using interconnections associated with DSSD™ storage devices of a fast tier of a 2 TIERS™ storage system. Other embodiments can use other arrangements to provide RDMA connections supporting data transfer between compute nodes using RDMA verbs. For example, ScaleIO™ software can be extended to add support for RDMA verbs for clustering the data between the compute nodes. This may involve C++ translation of the ScaleIO™ code to recognize the lowest latency at each transfer but will typically not require any significant change to the ScaleIO™ software modules other than the libraries used.

Another illustrative embodiment will now be described in more detail with reference to FIG. 4. In this embodiment, configuration 400A at the left side of the figure shows multiple networked compute nodes 402 comprising respective processors 404 and memories 406. Each of the memories 406 more particularly comprises DRAM as illustrated. The compute nodes 402 are configured to communicate with one another via InfiniBand (IB) Fourteen Data Rate (FDR) connections 405 operating at 14.0625 Gb/s per lane, resulting in a data rate of 56.25 Gb/s for each of the FDR ports, which are assumed to comprise four lanes per port.

This arrangement is reconfigured as illustrated at 400B to include the same networked compute nodes 402 but now sharing an in-memory database 410. The IB-FDR connections 405 between the compute nodes 402 of the configuration 400A are eliminated in configuration 400B. Instead, it is assumed that data flows between the compute nodes 402 using RDMA data transfers over RDMA connections. The DRAMs of the individual compute nodes 402 form respective portions of the in-memory database 410 in the configuration 400B. The in-memory database 410 is assumed to be configured under software-defined storage control in the configuration 400B, although the figure does not illustrate the software-defined storage controller.

Figure 3:
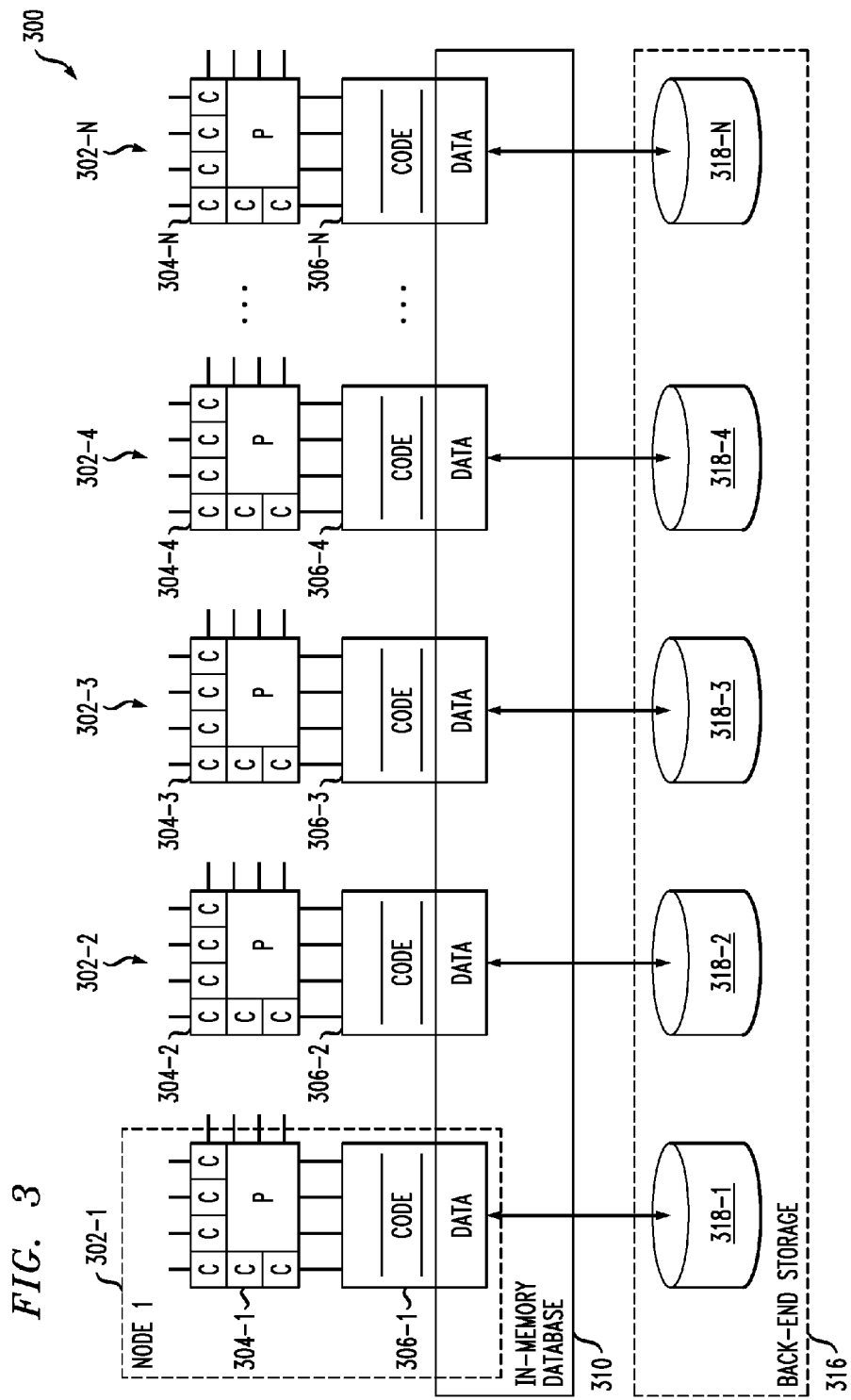
FIG. 3 shows another illustrative embodiment of an information processing system comprising an in-memory database with memory clustering implemented using software-defined storage functionality.
Figure 4:
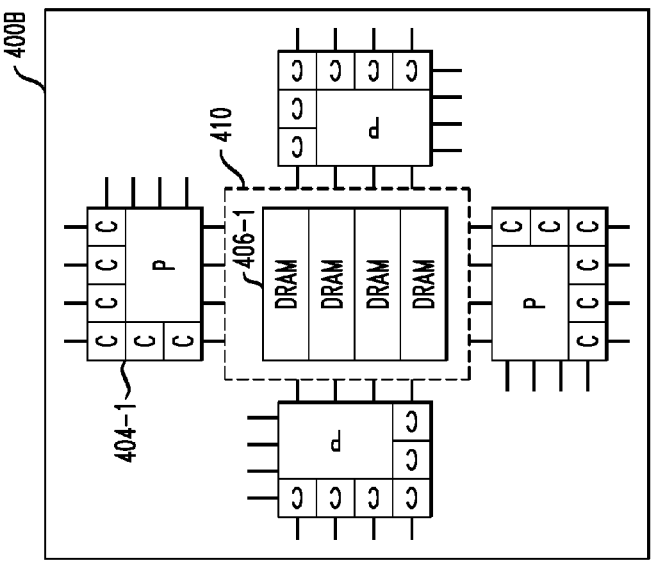
FIG. 4 shows an example reconfiguration of multiple networked compute nodes of an information processing system into multiple compute nodes sharing an in-memory database configured under software-defined storage control in an illustrative embodiment.
Figure 4:
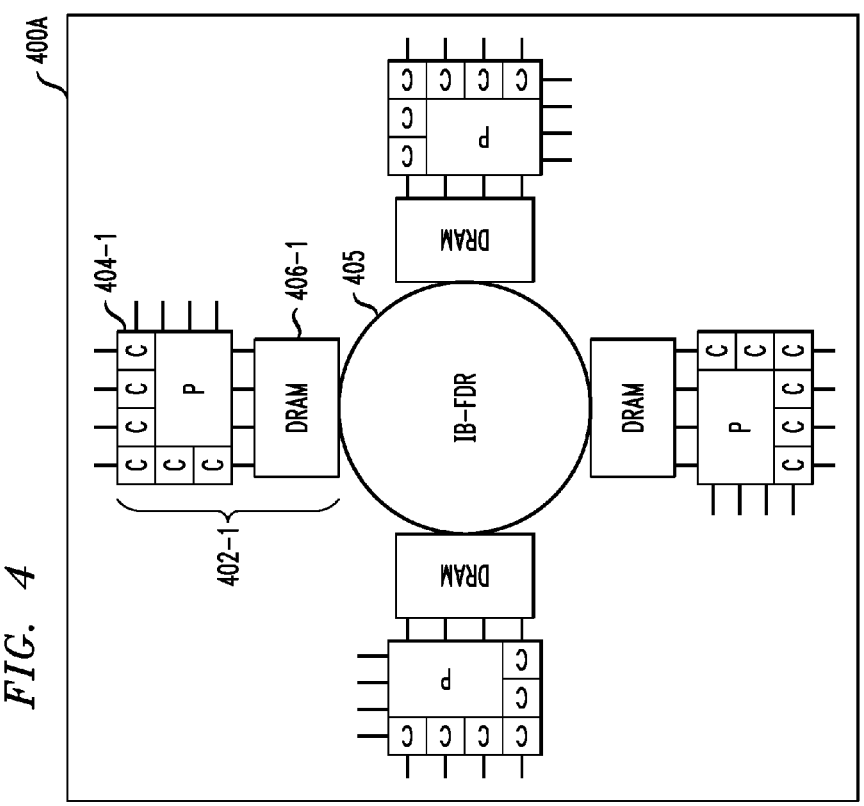

It should be understood that the particular node and component configurations illustrated in FIGS. 3 and 4 are presented by way of illustrative example only, and should not be construed as limiting in any way. Numerous alternative configurations of in-memory databases and other system elements can be used in other embodiments.

Illustrative embodiments disclosed herein can provide a number of significant advantages relative to conventional arrangements.

For example, one or more embodiments provide enhanced data access performance and scalability for in-memory data analytics such as SAP HANA and Tachyon. More particularly, limitations associated with conventional SAP HANA and Tachyon implementations are effectively removed using techniques disclosed herein. These include limitations on the maximum number of nodes that can be supported for a desired performance level, as well as limitations of the achievable data access latency. Illustrative embodiments can therefore provide significantly improved performance and scalability relative to conventional SAP HANA and Tachyon implementations. Similar improvements are provided in the context of other in-memory database applications.

Some embodiments advantageously avoid excessive data access delays such as those associated with conventional in-memory data analytics engines that build block clusters using CORFU ("Clusters of Raw Flash Units") interconnected using Fibre Channel (FC). Such FC connections typically have latencies on the order of 10-100× higher than those achievable in one or more embodiments described herein.

Another advantage in some embodiments is an enhanced ability to recover from node failures. For example, one or more embodiments based on ScaleIO™ software-defined storage exhibit substantially faster failure recovery times than conventional SAP HANA and Tachyon implementations. An in-memory database implemented using ScaleIO™ can allow rapid access to the same data on a different server or other compute node responsive to a failure in one of the servers or other compute nodes.

These advantages are achieved in some embodiments without requiring expensive servers that each include very large memories, and therefore instead allow a given system to be configured using large numbers of smaller servers with less memory to form a unified memory cluster providing a single storage pool accessible to each of those servers. Some embodiments are therefore particularly well suited for use in processing very large data sets, such as those associated with analytics involving the Internet of Things (IoT). Such IoT data sets can be on the order of PBs in size.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as compute nodes 102, or portions thereof, can be implemented as respective tenants of such a multi-tenant environment.

Back-end storage of a given system disclosed herein can also be implemented at least in part utilizing cloud infrastructure. Examples of cloud-based object stores that can be utilized for back-end storage in some illustrative embodiments include Amazon Web Services (AWS), Simple Storage Service (S3), Google Cloud Platform (GCP) Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system 100, although in other embodiments a given tenant can have multiple containers. The containers may be utilized to implement a variety of different types of functionality within the system 100. For example, containers can be used to implement respective compute nodes or cloud storage nodes of a cloud computing and storage system. The compute nodes or storage nodes may be associated with respective cloud tenants of a multi-tenant environment of system 100. Containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of compute nodes 102, in-memory database 110, software-defined storage controller 112 and data mover modules 114 are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, compute nodes, in-memory databases, software-defined storage controllers, data mover modules and associated storage devices. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   a plurality of compute nodes each comprising a processor coupled to a memory; and
   a storage system configured for communication with the compute nodes over at least one network;
   the storage system comprising a software-defined storage controller configured to implement an in-memory database accessible as a unified memory cluster to respective processors of the compute nodes;
   wherein the in-memory database comprises portions of respective memories of the compute nodes forming a single storage pool; and
   wherein a capacity of the single storage pool is expanded using an additional portion of the memory of one of the compute nodes responsive to an overflow event associated with the memory of another one of the compute nodes.

2. The apparatus of claim 1 wherein the compute nodes comprise respective analysis nodes that run respective applications configured to utilize analytics functionality of the in-memory database.

3. The apparatus of claim 1 wherein the storage system further comprises:
   back-end storage; and
   one or more data mover modules configured to move data between the in-memory database and the back-end storage.

4. The apparatus of claim 1 wherein the storage system comprises a multi-tier storage system having at least a front-end storage tier and a back-end storage tier with the front-end storage tier comprising a fast tier having a relatively high input-output processing speed and a relatively low capacity and the back-end storage tier comprising a capacity tier having a relatively low input-output processing speed and a relatively high capacity.

5. The apparatus of claim 4 wherein the in-memory database is implemented as an additional tier of the multi-tier storage system above the front-end storage tier of the multi-tier storage system.

6. The apparatus of claim 4 wherein the back-end storage tier comprises an object store configured to store data in the form of objects having respective object identifiers.

7. The apparatus of claim 1 wherein the portions of respective memories of the compute nodes comprise respective dynamic random access memories of the compute nodes.

8. The apparatus of claim 1 wherein the portions of respective memories of the compute nodes comprise respective flash memories of the compute nodes.

9. The apparatus of claim 1 wherein the compute nodes are configured to communicate with one another using remote direct memory access connections.

10. The apparatus of claim 1 wherein the unified memory cluster provided by the in-memory database has an associated file system configured to support analytics functionality of the in-memory database.

11. The apparatus of claim 1 wherein the in-memory database comprises a relational database management system.

12. The apparatus of claim 1 wherein the in-memory database comprises column-oriented portions in the memories of one or more of the compute nodes and row-oriented portions in the memories of one or more other ones of the compute nodes.

13. The apparatus of claim 1 wherein the single storage pool is expandable by both row and column responsive to one or more overflow events.

14. The apparatus of claim 1 wherein the in-memory database is configured to recover from a failure in the memory of one of the compute nodes by obtaining corresponding data from the memory of another one of the compute nodes.

15. An information processing system comprising the apparatus of claim 1.

16. A method comprising:
    configuring a storage system for communication over at least one network with a plurality of compute nodes each comprising a processor coupled to a memory;
    implementing an in-memory database accessible as a unified memory cluster to respective processors of the compute nodes;
    wherein the in-memory database is implemented under the control of a software-defined storage controller of the storage system; and
    wherein the in-memory database comprises portions of respective memories of the compute nodes forming a single storage pool; and
    expanding a capacity of the single storage pool using an additional portion of the memory of one of the compute nodes responsive to an overflow event associated with the memory of another one of the compute nodes.

17. A non-transitory processor-readable storage medium having stored therein program code of one or more software programs, wherein the program code when executed by at least one processing device causes said processing device: to configure a storage system for communication over at least one network with a plurality of compute nodes each comprising a processor coupled to a memory; and
    to implement an in-memory database accessible as a unified memory cluster to respective processors of the compute nodes;
    wherein the in-memory database is implemented under the control of a software-defined storage controller of the storage system; and
    wherein the in-memory database comprises portions of respective memories of the compute nodes forming a single storage pool; and
    to expand a capacity of the single storage pool using an additional portion of the memory of one of the compute nodes responsive to an overflow event associated with the memory of another one of the compute nodes.

18. The method of claim 16 wherein the in-memory database comprises column-oriented portions in the memories of one or more of the compute nodes and row-oriented portions in the memories of one or more other ones of the compute nodes.

19. The method of claim 16 wherein the single storage pool is expandable by both row and column responsive to one or more overflow events.

20. The method of claim 16 wherein the in-memory database is configured to recover from a failure in the memory of one of the compute nodes by obtaining corresponding data from the memory of another one of the compute nodes.

\* \* \* \* \*